United States Patent
Hegde et al.

(10) Patent No.: US 12,411,793 B2
(45) Date of Patent: Sep. 9, 2025

(54) CONTROL OF POWER USE OF A DEVICE POWERED BY A COMMUNICATION BUS AND DETERMINING SIDEBAND SIGNALING VOLTAGE LEVEL

(71) Applicant: Intel Corporation, Santa Clara, CA (US)

(72) Inventors: Mythili Hegde, Bangalore (IN); Shailendra Singh Chauhan, Bengaluru (IN); Arunthathi Chandrabose, Bangalore (IN); Santhosh Ap, Bangalore (IN); Shashi Kant Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 17/680,902

(22) Filed: Feb. 25, 2022

(65) Prior Publication Data
US 2023/0273891 A1 Aug. 31, 2023

(51) Int. Cl.
*G06F 13/42* (2006.01)
(52) U.S. Cl.
CPC .. *G06F 13/4221* (2013.01); *G06F 2213/0026* (2013.01)
(58) Field of Classification Search
CPC ............ G06F 13/4221; G06F 2213/0026
See application file for complete search history.

(56) References Cited

U.S. PATENT DOCUMENTS

| | | | | |
|---|---|---|---|---|
| 2009/0097401 A1* | 4/2009 | Diab | ................. | H04L 12/12 370/230 |
| 2014/0207977 A1* | 7/2014 | Hang | ................. | G06F 13/385 710/16 |
| 2014/0244869 A1* | 8/2014 | Adrian | ................. | G06F 13/4022 710/106 |
| 2015/0301575 A1* | 10/2015 | Dreps | ................. | G06F 1/324 713/322 |
| 2016/0188245 A1* | 6/2016 | Thadi Suryaprakash | | G06F 1/3296 710/13 |
| 2016/0266593 A1* | 9/2016 | Bareng | ................. | G05F 1/66 |

* cited by examiner

*Primary Examiner* — Henry Tsai
*Assistant Examiner* — Harry Z Wang
(74) *Attorney, Agent, or Firm* — Essential Patents Group, LLP

(57) ABSTRACT

An apparatus comprises a circuit board comprising a connector in or on the circuit board. The apparatus is to be coupled to a bus via the connector. The apparatus comprises first circuitry to communicate with a processor via the connector and bus, second circuitry to detect a utilization state of the first circuitry, determine, based on the detected utilization state of the first circuitry, a level of current to be conducted with the connector; and generate a signal indicating of whether the level of current exceeds a threshold current capacity of the connector, and third circuitry to select a first operational mode from among multiple operational modes. The first circuitry is to operate in any of the multiple operational modes responsive to the third circuitry. Additional circuitry may be provided to identify a voltage level capability of the apparatus and to configure voltage level shifting circuitry connected to the bus.

20 Claims, 8 Drawing Sheets

CONTROL OF POWER USE OF A DEVICE POWERED BY A COMMUNICATION BUS AND DETERMINING SIDEBAND SIGNALING VOLTAGE LEVEL

BACKGROUND

Modern computer systems come in many forms, such as servers, desktop units, laptops, and smartphones. A computer system may include many components, such as a central processing unit (CPU), memory, input/output (I/O) devices, such as a keyboard and display, specialized chips for performing operations like graphics processing or communications, and various other components. Computer systems may include a system-on-a-chip (SOC) that integrates many of the components onto a single integrated circuit (IC) or a system-in-package (SIP) that integrates two or more ICs in a single package. Some computer systems include an add-in module or expansion card. In all forms, computer systems include one or more busses to transfer data between devices or components within the computer system.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
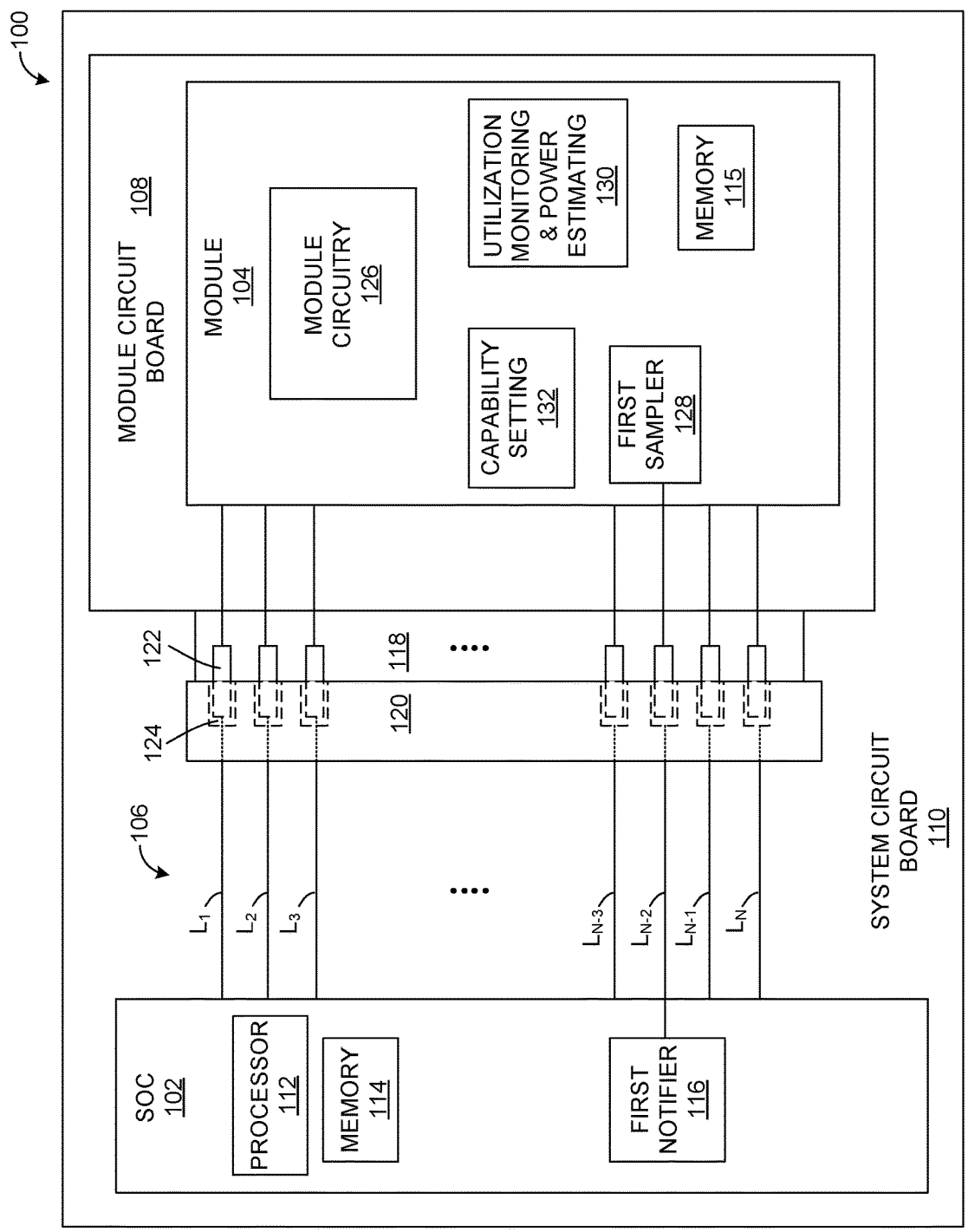
FIG. 1 is a functional block diagram illustrating elements of a computing system to limit electric current consumption of a module that receives power from a bus in accordance with some embodiments.

In a computer system, a module, such as an add-in module or expansion card, may be connected to bus a via module connector and socket or slot on the mother board of the system. An add-in module adds functionality to the computer system. It is important that the module be operated in a way that is compatible with various specifications of the computer system, such as a specification for the bus. An add-in module may be connected at the time of manufacturing by a board manufacturer, a module manufacturer, or by an original equipment manufacturer (OEM). In addition, a module may be connected by an end user subsequent to manufacture. Because the party that connects the module to the bus may not be aware of whether the generation of module is compatible with a bus or other specification, it is possible that the party will insert a non-compliant generation of add-on card into socket of a system circuit board. If the specification relates to a threshold current capacity per pin, excessive heat and reliability issues may result. If the specification relates to voltage ranges used for sideband signals, a mismatch in the sideband signaling voltage may lead to the electrical stress in the host or add-card.

Various embodiments relate generally to computing systems that limit electric current consumption of a module that receives power from a bus when the module operates in a mode or is expected to operate in a mode in which electric current consumption may exceed a threshold. Accordingly, an advantage of some embodiments is that the computer system does not generate excessive heat and or suffer from reliability issues.

Other embodiments relate generally to computing systems that include a mechanism to assure that a voltage level used by a module, e.g., an add-in module, and by a host for sideband signaling match. Accordingly, an advantage of some embodiments is that the computer system sideband signals of the module and host are compatible, and electrical stress in the host or module are avoided.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. A module may comprise a circuit or circuitry, as defined below. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The terms "functional block," "functional unit," or "component" herein generally refer to any circuitry that performs a particular function. A "functional block" or "component" may be a unit of logic, circuit, cell, or chip layout that is reusable. A functional block is sometimes colloquially referred to as an IP (intellectual property) block. A few examples of functional blocks or components include processor cores, memories, caches, floating point processors, memory controllers, bus controllers, graphics processors, transceivers, network interface controllers, and display controllers. One or more portions of a larger functional block can themselves be designated as functional blocks. For example, an instruction execution unit and cache controller can be functional units or components of a processor functional unit. It should be appreciated that the foregoing examples are a non-exhaustive list of functional blocks.

As used herein, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processing units (GPU). In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

As used herein, the term "hardware interface" refers to one or more physical components of a given device, where said one or more physical components accommodate coupling to interact with one or more physical components of another device. For example, a hardware interface may comprise conductive contacts of a connector or a socket that receives a connector. As another example, a hardware interface may comprise metal contacts, pads, metallization features, or other interconnect structures on a surface of or within a circuit board or integrated circuit (IC) chip. As a further example, a hardware interface may comprise an interconnect between contacts of respective components, such as solder or an interposer.

As used herein, the term "packaged device" means an integrated circuit (IC) comprising at least one IC chip. A packaged device may be a single IC chip or a host IC chip and one or more IC chiplets coupled to the host IC chip. The term "IC chiplet" refers to an IC die structure that is smaller than the host chip. A host die and an IC chiplet may be electrically interconnected with one another via a hardware.

FIG. 1 is a functional block diagram illustrating elements of a computing system to limit electric current consumption of a module that receives power from a bus in accordance with some embodiments.

Computing system 100 comprises a system-on-a-chip (SOC) 102. In some embodiments, system 100 includes a processor in lieu of SoC 102. System 100 further comprises module 104, a bus 106, a module circuit board 108, and a system circuit board 110 (which may be referred to in the art as a mother board). All or part of bus 106 is attached to or an integral component of system circuit board 110.

SOC 102 may include processor 112, memory 114, and first notifier circuitry 116. It will be understood that SOC 102 includes additional components generally included in an SOC and not all components of SOC 102 are shown in FIG. 1. In embodiments in which a processor is provided in lieu of SOC 102, various components typically included in a computer system may be provided as discrete components physically separate from the processor. Examples of components generally or typically included in an SOC or provided with a computer system include hardware and software for providing audio and display functions and input/output (I/O) functions, nonvolatile and volatile memory devices, and connectivity devices, such as a network interface, a cellular interface, or a wireless interface. In embodiments, SOC 102 may be the same as or similar to SOC 801, processor 112 may be the same as or similar to processor 804, and memory 114 may be the same as or similar to memory 830. SOC 801, processor 804, and memory 830 are described below with reference to FIG. 8. As described below, hardware, software, or both for a particular function of computing system 100 may be provided by module 104. In some embodiments, first notifier circuitry 116 may be a standalone component attached to system circuit board 110.

According to various embodiments, bus 106 comprises a plurality of bus lines $L_1$-$L_N$, e.g., wires or signal traces. In this description, a PCIe bus may be used as an example of bus 106. Similarly, module 104 and/or module circuit board 108 may be a PCIe module, which is used as an example of a device coupled to bus 106. However, the present disclosure is not limited to PCIe devices or buses. It should be understood that descriptions about a PCIe bus or module may be applicable to any other device coupled to any computer bus, communication bus, or bus.

In various embodiments, bus 106 is a bus that conforms to or is compatible with an industry standard. As one example, bus 106 conforms to Peripheral Component Interconnect Express (PCI Express® or PCIe®) bus standard, e.g., PCI Express Base Specification Revision 6.0, version 1.0, Jan. 11, 2022, or any revision preceding Revision 6.0, ver. 1. PCI Express connects "modules" to a "host" with a "link." A link can include one to 16 "lanes." Each lane is composed of two differential signaling pairs. Two bus lines (one differential signaling pair) are used to receive data; the other two bus lines (the other differential signaling pair) are used to transmit data. Thus, each lane comprises four of bus lines $L_1$-$L_N$. In the PCI Express specification, a host is an electrical source/master, e.g., a processor or SOC 102, a "platform" is a physical location, such as system circuit board 110, on which an add-in card or module, e.g., module 104, are mounted, and a module is an add-in card that is either plugged into a connector, e.g., socket 120, on the platform, or soldered on to the platform. An "add-in card" is a card or module plugged into a connector and mounted in a chassis socket.

The M.2 PCI Express specification defines interconnects based on a 75-position edge card connection scheme. The specification also defines an LGA (land grid array) pattern on the backside of a board that can be connected to a grid of contacts on a circuit board in a soldered-down scheme. In this description, a connector and a socket (or slot) may be used as an example of an edge card connection scheme. However, the present disclosure is not limited to edge card connection schemes. It should be understood that descriptions about edge card connection schemes may be applicable to a circuit board, e.g., module circuit board 108 or module 104, in a soldered-down scheme.

While an M.2 connector has 75 positions, some of the positions are used for a connector key. For example, eight positions may be used for the connector key so that the number of pins or contacts that connect to bus lines is 67. According to one or more versions of the M.2 PCI Express specification, the maximum current rating per contact in a connector is 0.5 A (continuous). In this description, a current rating of 0.5 A is used as an example of a threshold current capacity. However, the present disclosure is not limited to this current rating. Any desired current rating may be used as a threshold current capacity.

A variety of module sizes and form factors are defined in the M.2 PCI Express specification. In addition, several distinct sockets are defined, e.g., Socket 1, Socket 2, Socket 3. A connectivity socket is designated Socket 1. It may be suitable for WiFi, BT, NFC, WiGig. A WWAN/SSD/Other socket is designated as Socket 2. It may be suitable for WWAN+GNSS solutions, and various SSD and SSD cache configurations. An SSD Drive socket is designated as Socket 3. Each socket type has its own bus line configuration and mechanical key. Socket 1 utilizes a single 3.3 V bus line or pins as a power source for a PCIe module. Socket 2 utilizes five 3.3 V bus lines or pins as a power source. Socket 3 utilizes nine 3.3 V bus lines or pins as a power source. Thus, 1, 5, or 9 of bus lines $L_1$-$L_N$ may be used to provide a power supply to a module, e.g., module 104. In this description, Socket 2 may be used as an example. However, the present disclosure is not limited to Socket 2. It should be understood that descriptions about Socket 2 may be applicable to embodiments in which Sockets 1 or 3 are employed, or in which an LGA pattern on the backside of a board, e.g., module board 108, are connected to contacts of a motherboard, e.g., system circuit board 110, in a soldered-down scheme. In addition, it should be understood that descriptions about Socket 2 may be applicable to embodiments employing sockets of any type and not only sockets defined by the M.2 PCIe standard.

In addition to specifying bus lines for supplying power to a PCIe module, the M.2 PCI Express specification defines uses of other bus lines. As one example, a Socket 2 pinout may include communication specific signals, PCI-e signals, USB (universal serial bus) signals, HSIO (high speed input output) signals, SSIC signals, SATA (serial advanced technology attachment) signals, UIM (user identity module) signals, and module configuration (CONFIG) pins. Various bus lines $L_1$-$L_N$ are used for these signals.

Socket 2 communication specific signals include W_DISABLE (wireless disable—disables radio operation on add-in cards that implement radio frequency applications) and COEX[0 . . . 3] (coexistence between WWAN and WiFi+BT on Socket 1). Various bus lines $L_1$-$L_N$ are used for these communication specific signals.

Socket 2 supplemental communication specific signals include FULL_CARD_POWER_OFF, RESET (resets module), GPIO[0 . . . 11] lines (general purpose input output—can be used for various functions), ANTCTL[0 . . . 3] (antenna control), IPC[0 . . . 7] (interprocess communication signals), AUDIO[0 . . . 3], WAKE_ON_WWAN (used to wake platform by WWAN device), and DPR (signal from SAR sensor). Various bus lines $L_1$-$L_N$ are used for these supplemental communication specific signals.

Module circuit board 108 (sometimes referred to in the art as an "add-in card" or "expansion card") comprises a connector 118. A socket 120 is connected to bus 106 and is adapted to receive connector 118. In some embodiments, an LGA pattern on the backside of module board 108 may be provided in lieu of connector 118 and socket 120, and module board 108 is coupled to bus 106 via contacts of system circuit board 110 in a soldered-down scheme.

A variety of circuit board sizes and form factors, as well as a variety of socket and connector types, are defined in the M.2 PCI Express specification. Module circuit board 108 and connector 118 may be any suitable size, form, or type, either in defined in the M.2 PCI Express specification or otherwise defined. Connector 118 may be mounted on or integral with module circuit board 108. As one example, connector 118 may comprise a plurality of metal pads, pins, or other interconnect structures 122 on a surface of a connector at an edge of the surface. In an embodiment, connector 118 comprises 67 conductive pads or pins, and a connector key. In various embodiments, socket 120 (sometimes referred to in the art as a "slot") comprises a plurality of conductive pads or surfaces 124 that correspond with the pads, pins, or other interconnect structures of connector 118. In various embodiments, interconnect structures 122 of connector 118 are inserted into an opening in socket 120 where they contact conductive surfaces 124.

Module 104 may be any type of module that provides a particular function of computing system 100. In some embodiments, module 104 is a PCIe module. In various embodiments, module 104 comprises module circuitry 126, memory 115, first sampler circuitry 128, utilization monitoring and power estimating circuitry 130, and capability setting circuitry 132.

Module circuitry 126 comprises hardware, software, firmware, or a combination of hardware, software, and firmware for performing one or more functions of computer system 100. In addition, in embodiments, module circuitry 126 comprises circuitry to participate in a communication with processor 112 via connector 118 and bus 106. In some embodiments, module 104 may be a graphics processing card and module circuitry 126 may comprise a GPU (graphics processing unit) and a memory. In some embodiments, module 104 may be a memory card and module circuitry 126 may comprise flash memory devices, a solid-state drive, or a hard disk drive. In some embodiments, module 104 may be a network card and module circuitry 126 may comprise a network interface controller. In some embodiments, module 104 may be a Wi-Fi® module, a Bluetooth® module, a satellite navigation module, a near field communication (NFC) module, a digital radio module (e.g., 2G, 3G, LTE), a WiGig® (60 GHz WiFi) module, a wireless wide-area network (WWAN) module, a wireless local-area network (WLAN) module, and module circuitry 126 may include circuitry needed to implement functions of the respective module.

Depending on the type of functions module 104 performs, module circuitry 126 may communicate any of a variety of types of signals with processor 112, e.g., a data signal, an address signal, a control signal, or a supply (or other voltage) signal.

First sampler circuitry 128 may be connected to a particular one of the bus lines $L_1$-$L_N$, e.g., $L_{N-2}$ and to utilization monitoring and power estimating circuitry 130. In various embodiments, first notifier circuitry 116 in SOC 102 is also connected to the particular one of the bus lines $L_{N-2}$. In embodiments, first notifier circuitry 116 places a signal on the particular one of the bus line $L_{N-2}$. The signal identifies a threshold current capacity of the connector 118, socket 120, or one or more bus lines. The first notifier circuitry 116 may read the threshold current capacity from a memory, e.g., memory 114, and be based on a value in an industry standard or a data sheet of a manufacturer. In an embodiment, first sampler circuitry 128 samples the signal on the particular bus line $L_{N-2}$ to detect the threshold current capacity. First sampler circuitry 128 may sample the bus line during a configuration or start-up stage of module 126. Based on the sampled signal, first sampler circuitry 128 provides the threshold current capacity to utilization monitoring and power estimating circuitry 130.

In embodiments, a threshold current capacity may be the threshold current capacity of a connector, socket, or bus line. For example, the threshold current capacity of a single connector, socket, or bus line may be a threshold peak current or a threshold average current of the applicable interconnect structure, conductive surface, or conductive trace. In embodiments, a threshold current capacity may be the threshold current capacity of a multiple connectors, sockets, or bus lines. For example, the threshold current capacity of multiple connectors, sockets, or bus lines may be a threshold peak current or a threshold average current of a single connector, socket, or bus line.

Utilization monitoring and power estimating circuitry 130 detects a utilization state of module 104 or module circuitry 126. Based on the detected utilization state of module 104 or module circuitry 126, utilization monitoring and power estimating circuitry 130 determines a level of current to be conducted within one or more of individual conductive interconnect structures 122, conductive surfaces 124, or bus lines. Utilization monitoring and power estimating circuitry 130 generates a signal which comprises an indication of whether the level of current exceeds a threshold current capacity of the connector 118, socket 120, or bus 106. As used herein and in the claims, the term "connector" may refer to any of connector 118, socket 120, or bus 106.

The detected utilization state may be a utilization state in which module circuitry 126 is currently operating, e.g., an actual utilization state, or it may be a utilization state that module circuitry 126 has been requested to or expects to enter, e.g., an expected utilization state. A utilization state may be an explicitly defined state, e.g., idle mode or 3G connection transmission mode in a radio, or a state implied by a request to perform a particular function, e.g., a request to download or decompress a file of a particular size.

In embodiments, a utilization state may comprise one or more characteristics of operation by module circuitry 126, or one or more characteristics of an environment in which module circuitry 126 operates. In some embodiments, a utilization state may comprise one or more actual characteristics. In some embodiments, a utilization state may comprise one or more predicted characteristics, e.g., a characteristic which is predicted based on a level of a metric, a rate of change of the metric, or both. A characteristic based on a rate of change may be a first order, second order, or other order rate of change. One example of an environmental characteristic is an availability of a network. Network availability refers to the strength and quality of a network signal. If signal strength is high and signal quality is good, a modem may switch to a higher order modulation scheme to enhance throughput and communication quality. As modulation schemes become more sophisticated, more modem resources may be used, and modem power consumption can increase. Conversely, when signal strength and quality is weak, a modem may switch to lower order modulation scheme to maintain link reliability. A less sophisticated modulation scheme may use fewer modem resources and require a low power level. Examples of operational characteristics include a quantity of resources used, such as an amount of memory, or a number of memory accesses or processing cycles in a time period. Another example of a characteristic of a utilization state is a measured value of a temperature of module circuitry 126 or another component. In an embodiment, temperature sensing circuitry may be provided in system 100. Another example of a characteristic of a utilization state is throughput. In yet another example, the number of component carriers (CA), which are frequency blocks, that are used or are expected to be used may be a characteristic of a utilization state. In wireless communication, the data rate per user can be increased using a carrier aggregation technique, i.e., by increasing the number of component carriers assigned to the same modem. In a further example, a MIMO (multiple input and multiple output) radio communication technique may simultaneously send and receive two or more data signals over the same radio channel by utilizing multipath propagation. MIMO may employ multiple antennas. Various MIMO configurations may be characteristics of a utilization state.

In an embodiment, a utilization state includes or otherwise corresponds to a respective one or more conditions, each of a different respective metric of one or more power performance metrics. In an embodiment, a power performance metric is a peak current capacity. In an embodiment, a power performance metric is an average current capacity for a specified time period. In an embodiment, a power performance metric is the current conducted in a single interconnect structure 122 or conductive surface 124. In an embodiment, a power performance metric is the sum of the individual currents conducted by each of two or more interconnect structures 122 or conductive surfaces 124. In other embodiments, a power performance metric is peak or average power (wattage) for a specified time period in one or more interconnect structures 122 or conductive surfaces 124. In yet other embodiments, a power performance metric is a thermal dissipation value. Example thermal dissipation values for a WWAN module include: thermal dissipation of 4.8 W at a 105° die temp for an LTE cat. 4 150/50 Mbps use case: thermal dissipation of 6.0 W at a 105° die temp for an LTE cat. 16 980/150 Mbps use case; and thermal dissipation of 8.5 W at a 105° die temp for an ENDC: 5GNR (higher) Max DL+LTE (lower) MAX DL, where NR downlink 2.3 Gbps and LTE DL 1.2 Gbps, and uplink 150 Mbps use case. In the foregoing examples of thermal dissipation values, the use cases for the WWAN module include (a) concurrent video conference, plus content record, plus Office Productivity, plus download; and (b) Skype Desktop v8 two-way call, plus Office Productivity, plus download Skype record.

In various embodiments, utilization monitoring and power estimating circuitry 130 comprises a memory or circuitry that accesses a memory of module 104, e.g., memory 115, that stores reference data corresponding with performance profile information. Using the reference data, circuitry 130 may determine one or more power performance metrics. Reference data for each utilization state of module circuitry 126 specifies one or more characteristics of the utilization state, e.g., a level or a value, of a different power performance metric. For example, for a WWAN module, a characteristic of a first utilization state, e.g., one CA, may be a power performance metric of 1 W (or equivalent current), and a characteristic of a second utilization state, e.g., two CAs, may be a power performance metric of 2 W (or equivalent current). Module circuitry 126 may be operated in each utilization state under different environmental conditions and use cases to obtain performance profile information for the respective utilization states. The performance profile information may comprise one or more power performance metrics, e.g., peak or average power, peak or average current, for each utilization state.

Capability setting circuitry 132 may be coupled with utilization monitoring and power estimating circuitry 130 in order to receive the signal generated by circuitry 130 indicative of whether the current capacity threshold has been or is predicted to be exceeded. Capability setting circuitry 132 may also be coupled with module circuitry 126. In embodiments, module circuitry 126 has multiple operational modes in which it can operate, and, based on the signal, capability setting circuitry 132 selects any one of the multiple operational modes. In an embodiment, capability setting circuitry 132 selects an operational mode associated with a power budget that does not require supply current exceeding a threshold current capacity of a connector, socket, or bus line. Capability setting circuitry 132 also configures module circuitry 126 to operate in the selected operational mode. In response to being configured by capability setting circuitry 132, module circuitry 126 operates in the selected operational mode.

Figure 3:
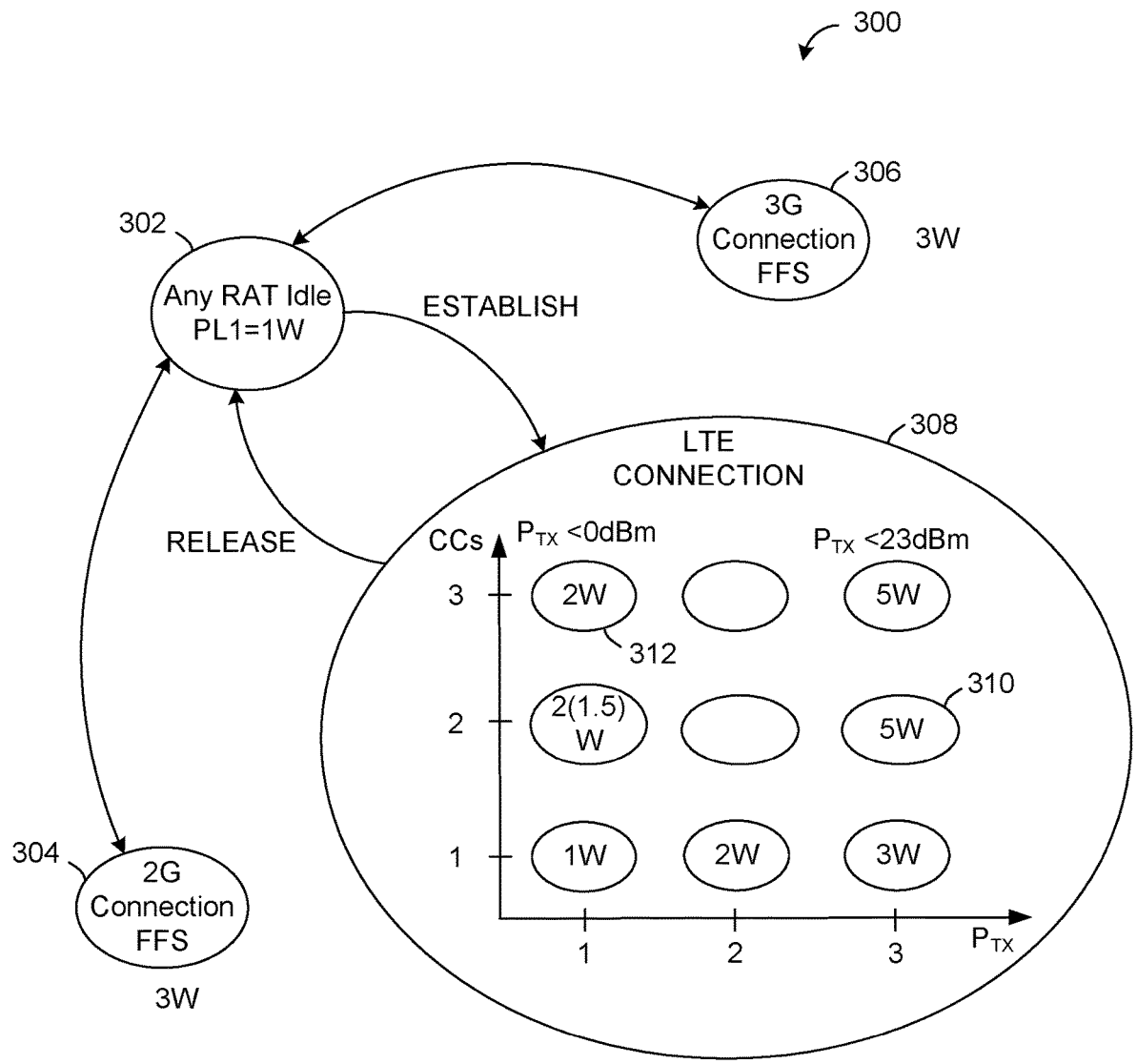
FIG. 3 illustrates a state diagram for limiting electric current consumption of a WWAN module in accordance with some embodiments.

In embodiments, module circuitry 126 comprises WWAN capability and an operational mode of module circuitry 126 may be a particular number of component carrier connections or a particular transmit power value, e.g., as show in FIG. 3. In embodiments, module 104 comprises a solid state drive (SSD) memory and operational modes of module circuitry 126 comprise PCIe dynamic power allocation (DPA) sub-states. DPA provides a capability to dynamically allocate power for a device. A DPA scheme can be used to specify a plurality of sub-states for a function, each sub-state defining a power allocation. For example, three sub-states may be specified for a function, wherein a first sub-state defines a 1 W power allocation, a second sub-state—defines a 2 W power allocation, and a third sub-state defines a 5 W power allocation. In embodiments, module 104 comprises a graphics processing module (GPU), and an operational mode is a particular clock value. GPU cores operate in synchrony with a clock. A GPU may be operated at multiple different clock speeds, each clock rate corresponding with one of multiple operational modes. While example operational modes are described with respect to specific module 126 functionality, e.g., WWAN, SSD, and GPU functions, it should be appreciated that, in embodiments, an operational mode for any type of module circuitry 126 may include a component carrier connection value, a transmit power value, a DPA sub-state, a clock speed, or any other suitable parameter.

Figure 2:
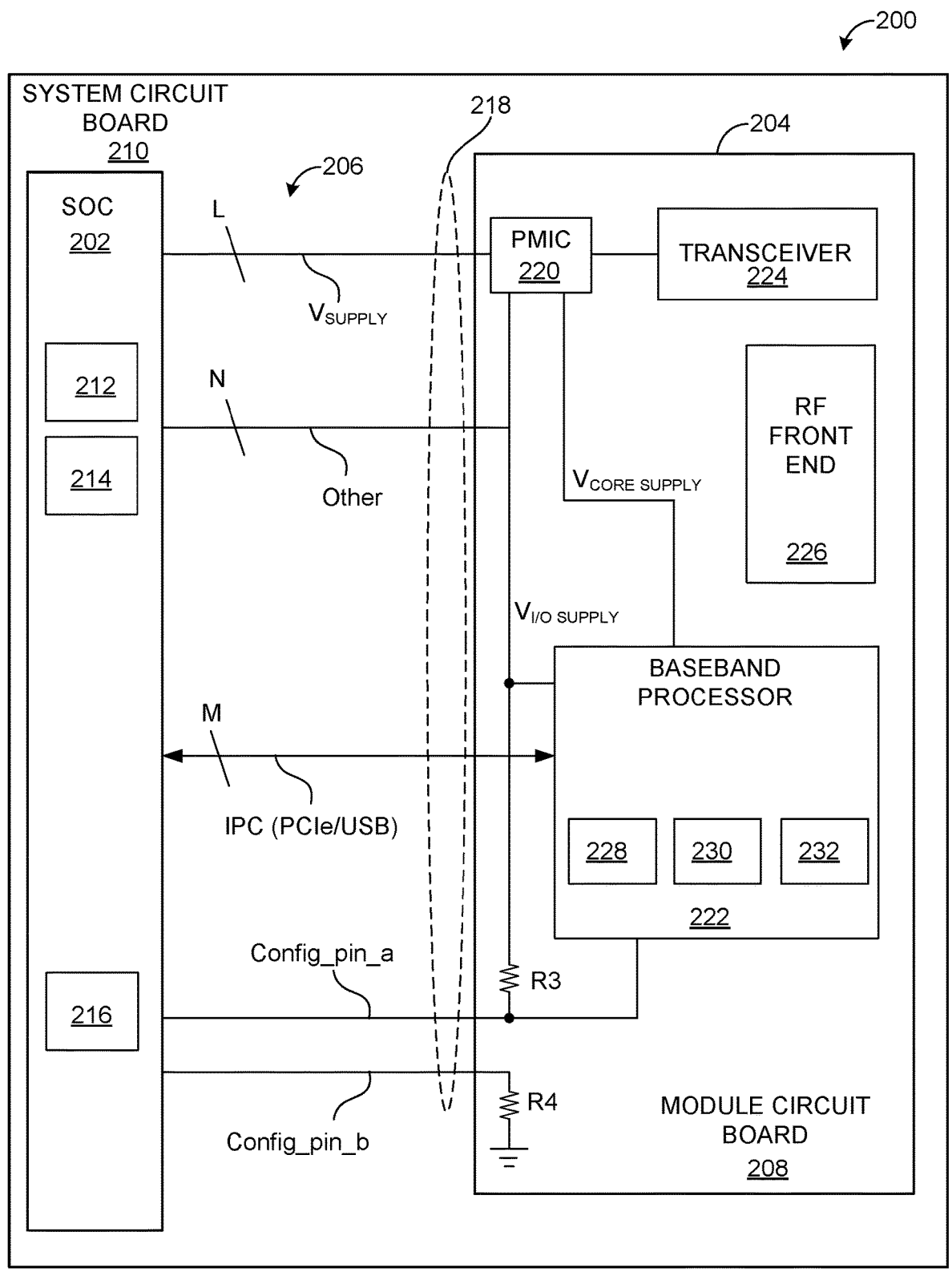
FIG. 2 is a functional block diagram illustrating elements of a computing system to limit electric current consumption of a wireless wide area network (WWAN) module that receives power from a bus in accordance with some embodiments.

FIG. 2 is a functional block diagram illustrating elements of a computing system to limit electric current consumption of a WWAN module that receives power from a bus in accordance with some embodiments.

Computing system 200 comprises a system-on-a-chip (SOC) 202. In some embodiments, system 200 includes a processor in lieu of SOC 202. System 200 further comprises WWAN module 204, bus 206, module circuit board 208, and a system circuit board 210. All or part of bus 206 is attached to or an integral component of system circuit board 210.

SOC 202 may include processor 212, memory 214, first notifier circuitry 216. It will be understood that SOC 202 includes additional components included in a SOC and not all components of SOC 202 are shown in FIG. 1. In embodiments in which a processor is provided in lieu of SOC 202, various components typically included in a computer system may be provided as discrete components physically separate from the processor. In embodiments, SOC 202 may be the same as or similar to SOC 801, processor 212 may be the same as or similar to processor 804, and memory 214 may be the same as or similar to memory 830. First notifier circuitry 216 may be the same as or similar to first notifier circuitry 116.

Bus 206 comprises a plurality of bus lines, wires or signal traces. In various embodiments, bus 206 is a bus that conforms to or is compatible with an industry standard. In an embodiment, bus 106 conforms to PCI Express bus standard. Bus 206 comprises L power supply bus lines $V_{SUPPLY}$. Bus 206 comprises M interprocess communication bus lines, such as PCIe bus lines or USB bus lines. Bus 206 comprises N other bus lines, and one or more configuration bus lines, e.g., Config_pin_a and Config_pin_b.

WWAN module 204 may be an add-in card that is either plugged into a connector, e.g., a socket, or soldered on to system circuit board 210. Hardware interface 218 connects various components on module circuit board 208 with bus 206. In an embodiment, hardware interface 218 conforms to the M.2 PCI Express specification. In an embodiment, hardware interface 218 comprises a socket to receive a connector. In an embodiment, hardware interface 218 comprises contacts, pads, metallization features, or other interconnect structures on a surface of or within module circuit board 208 and corresponding contacts or other conductive features on a surface of system circuit board 210.

WWAN module 204 comprises power management integrated circuit (PMIC) 220, e.g., to implement various power management operations for module 204. In addition, WWAN module 204 comprises various components to implement WWAN functions, such as baseband processor 222, transceiver 224, radio frequency (RF) front end 226, and pull-up resistors R3, R4.

PMIC 220 receives power supply signals on bus lines L. PMIC 220 provides power ($V_{CORE\ SUPPLY}$) needed to operate baseband processor 222. PMIC 220 also provides power ($V_{I/O\ SUPPLY}$) needed to operate input/output components of baseband processor 222.

In an embodiment, WWAN module 204 comprises sampler circuitry 228, which may be the same as or similar to second sampler circuitry 128. In an embodiment, WWAN module 204 comprises utilization monitoring and power estimating circuitry 230, which may be the same as or similar to utilization monitoring and power estimating circuitry 130. In an embodiment, WWAN module 204 comprises capability setting circuitry 232, which may be the same as or similar to capability setting circuitry 132. In an embodiment, sampler circuitry 228, utilization monitoring and power estimating circuitry 230, and capability setting circuitry 132 may be within baseband processor 222, however, this is not essential.

Sampler circuitry 228 within baseband processor 222 may be coupled to Config_pin_a. First notifier circuitry 216 places a signal on Config_pin_a that identifies a threshold current capacity of hardware interface 218, e.g., a connector or socket, or both. Sampler circuitry 228 of baseband processor 222 samples the signal on Config_pin_a to detect the threshold current capacity. The signal may be sampled during a configuration or start-up stage of module 204. Based on the sampled signal, utilization monitoring and power estimating circuitry 230 detects an actual or expected utilization state of baseband processor 222 and/or other components of WWAN module 204.

Based on the detected utilization state, utilization monitoring and power estimating circuitry 230 determines a level of current to be conducted with hardware interface 218 or a connector, socket, or other interconnect structure of bus 206. Utilization monitoring and power estimating circuitry 230 generates a signal which comprises an indication of whether the level of current exceeds a threshold current capacity of the connector, socket, or other interconnect.

WWAN module 204 has multiple operational modes in which it can operate, and, based on the signal, capability setting circuitry 232 selects any one of the multiple operational modes. Capability setting circuitry 232 also configures WWAN module 204 to operate in the selected operation mode. In response to being configured by capability setting circuitry 232, WWAN module 204 operates in the selected operation mode. In an embodiment, the multiple operational modes of WWAN module 204 comprise operational modes of baseband processor 222.

FIG. 3 illustrates a state diagram 300 for a baseband processor, e.g., baseband processor 222, in accordance with some embodiments. State diagram 300 illustrates multiple operational modes for a baseband processor. Each operational mode may be associated with a predicted power level and (by implication) current level. The operational states include at least one RAT (radio access technology) idle operational mode 302, which is associated with a predicted power level of 1 W. In operational mode 304, the baseband processor uses 2G connection technology, which is associated with a predicted power level of 3 W. In operational mode 306, the baseband processor uses 3G connection technology, which is associated with a predicted power level of 3 W. In operational mode 308, the baseband processor uses LTE (long-term evolution) connection technology. Operational mode 308 may comprise a plurality of operational modes, depending on a transmit power $P_{TX}$ used and a number of CCs (component carriers) used. For example, operational mode 310 corresponds with two component carriers and a third level of transmit power, and is associated with a predicted power level of 5 W. As another example, operational mode 312 corresponds with three component carriers and a first level of transmit power, and is associated with a predicted power level of 2 W. It will be understood by one of ordinary skill that once a number of metal pads, pins, or other interconnect structures of a connector or socket is specified, a predicted power level may be converted into a predicted level of current in each of the pads, pins, or other interconnect structures.

Figure 4:
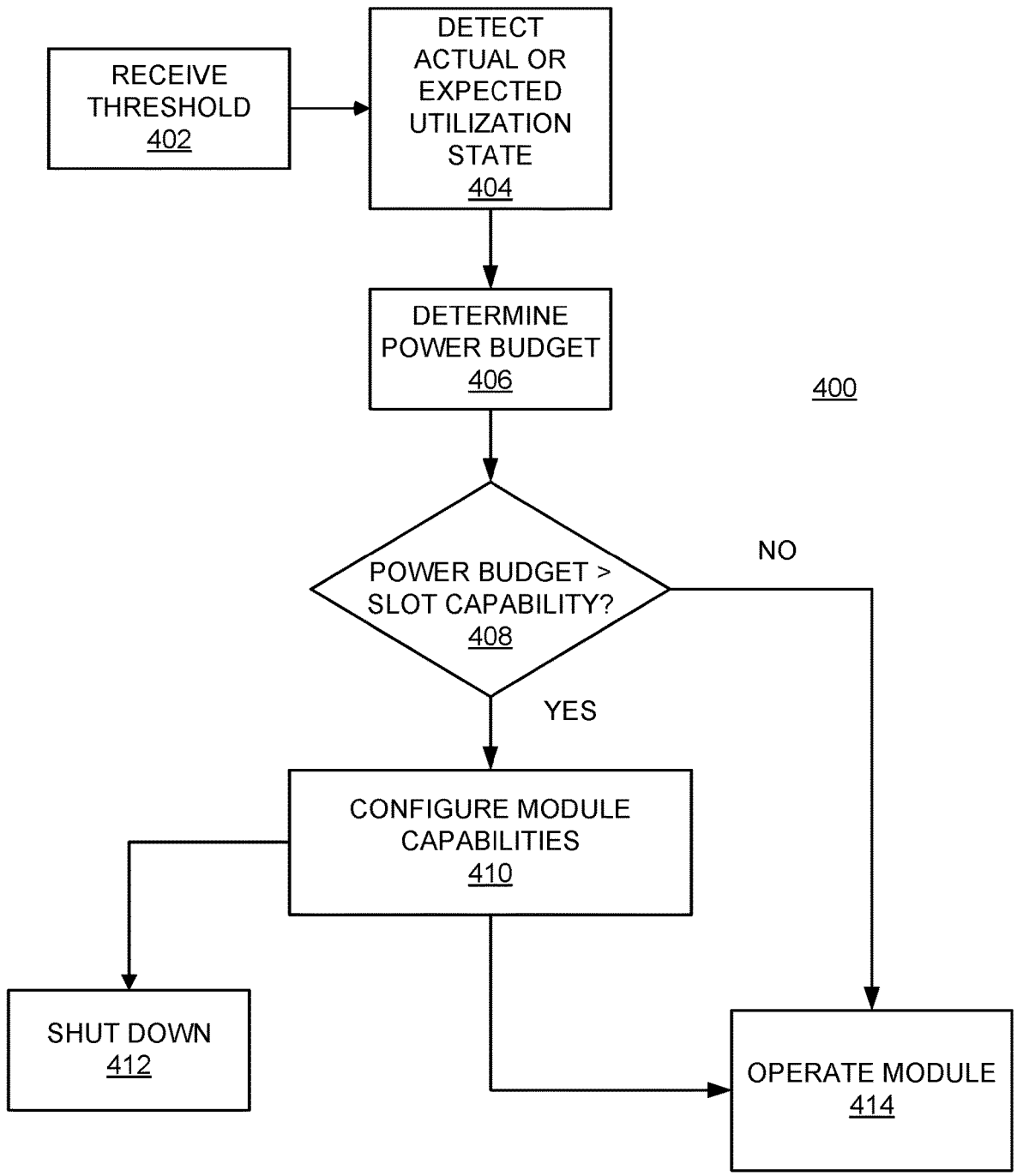
FIG. 4 illustrates a flow diagram of a process for limiting current in a module according to various embodiments.

FIG. 4 illustrates a flow diagram of a process 400 for limiting current in a module according to various embodiments. In various embodiments, process 400 may be employed with any type of PCIe module. In various embodiments, process 400 may be employed with an add-in card having a connector plugged into a socket. In an embodiment, process 400 may be employed with any type of WWAN module.

At 402, a threshold current capacity of a connector or socket is received. The threshold current or power capacity may be received during a configuration or start-up stage of module. The threshold current capacity or power may be received by sampler circuitry that samples a signal on a particular bus line, e.g., a configuration pin.

At 404, an actual or expected utilization state of multiple utilization states of the module is detected. Each utilization state may comprise one or more characteristics of operation (e.g., levels/values) of the module. Each characteristic may comprise one or more power performance metrics. The utilization state may be detected by utilization monitoring and power estimating circuitry.

At 406, a power budget is determined. The power budget is an estimate of power that will used or a rate of current that will be required in the actual or expected utilization state. The power budget may be determined using reference data corresponding with a plurality of utilization states, which may be stored in a memory. The power budget may be determined by utilization monitoring and power estimating circuitry.

At 408, the power budget is used to determine whether a current capacity threshold is predicted to be exceeded. The threshold current capacity may be of a connector, socket, or other interconnect. The determination of whether a current capacity threshold may be exceeded may be performed by utilization monitoring and power estimating circuitry.

If current capacity threshold may be exceeded, the module may be configured to operate in a first operational mode at 410. When operating in the first operational mode, the module does not or is not expected to exceed the current capacity threshold. In some circumstances, an operational mode in which the module operates at or below the current capacity is not available. In these circumstances, the module may be shut down at 412. The configuring of the module in the first operational mode 410 or the shutting down of the module at 412 may be performed by capability setting circuitry.

Subsequent to the module being configured to operate in the first operational mode at 410 or it being determined that the current capacity threshold is not predicted to be exceeded at 408, the module is operated at 414.

Figure 5:
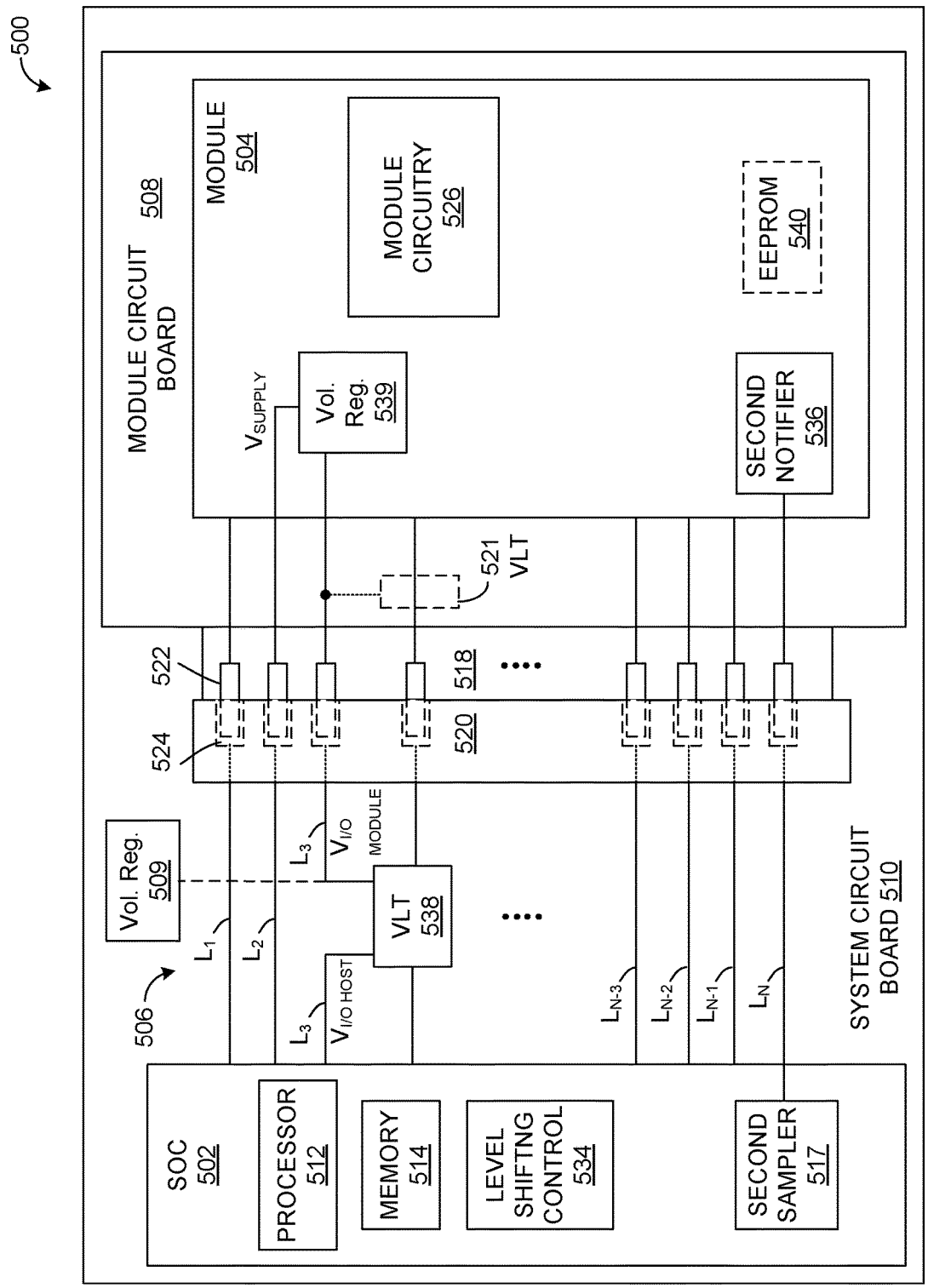
FIG. 5 is a functional block diagram illustrating elements of a computing system to assure that the voltage level used by a module and by a host for sideband signaling match in accordance with some embodiments.

FIG. 5 is a functional block diagram illustrating elements of a computing system to assure that the voltage level used by a module and by a host for sideband signaling match in accordance with some embodiments.

Computing system 500 comprises a system-on-a-chip (SOC) 502. In some embodiments, system 500 includes a processor in lieu of SOC 502. System 500 further comprises module 504, a bus 506, a module circuit board 508, and a system circuit board 510. All or part of bus 506 may be attached to or an integral component of system circuit board 510.

SOC 502 may include processor 512, memory 514, second sampler circuitry 517, and level shifting control circuitry 534. It will be understood that SOC 502 includes additional components included in an SOC and not all components of SOC 502 are shown in FIG. 5. In some embodiments a processor is provided in lieu of SOC 502; in these embodiments, various components typically included in a computer system may be provided as discrete components physically separate from the processor. Examples of components typically included in a SOC or provided with a computer system include hardware and software for providing audio and display functions and input/output (I/O) functions, nonvolatile and volatile memory devices, and connectivity devices, such as a network interface, a cellular interface, or a wireless interface. In embodiments, SOC 502 may be the same as or similar to SOC 801, processor 512 may be the same as or similar to processor 804, and memory 514 may be the same as or similar to memory 830.

According to various embodiments, bus 506 comprises a plurality of bus lines $L_1$-$L_N$, e.g., wires or signal traces. In various embodiments, bus 506 is a bus that conforms to or is compatible with an industry standard. As one example, bus 506 conforms to the PCIe bus standard. Bus 506 may be the same as or similar to bus 106. It is not essential that bus 506 be a PCIe bus. In various embodiments, bus 506 may be any computer bus, communication bus, or bus.

In various embodiments, one or more of bus lines $L_1$-$L_N$ of bus 506 may be used for sideband signals. As used herein, the term "sideband signal" comprises FULL_CARD_POWER_OFF, RESET, W_DISABLE, and COEX[0 . . . 3], and CONFIG[0 . . . 3]. While these signals are used as examples of sideband signals in this description, it should be appreciated that, in some embodiments, sideband signals may include other signals, such as any of the signals defined in an industry standard, e.g., PCI Express, or otherwise deemed necessary for a particular design.

Module circuit board 508 comprises a connector 518. A socket 520 is connected to bus 506 and is adapted to receive connector 518. Connector 518 may be mounted on or integral with circuit board 508. As one example, connector 518 may comprise a plurality of metal pads, pins, or other interconnect structures 522 on a surface of a connector at an edge of the surface. In an embodiment, connector 518 comprises 67 conductive pads or pins, and a connector key. In various embodiments, socket 520 comprises a plurality of conductive pads or surfaces 524 that correspond with the pads or pins of connector 518. In various embodiments, conductive pads or pins 522 of connector 518 are inserted into an opening in socket 520 where they contact conductive surfaces 524. In various embodiments, connector 518 may be similar to or the same as connector 118. In various embodiments, socket 520 may be similar to or the same as socket 120. In some embodiments, an LGA pattern on the backside of module board 508 may be provided in lieu of connector 518 and socket 520, and module board 508 is coupled to bus 506 via contacts of system circuit board 510 in a soldered-down scheme.

Module 504 may be any type of module that provides a particular function of computing system 500. In various embodiments, module 504 comprises module circuitry 526, second notifier circuitry 536, voltage regulator 507, and EEPROM 540. In some embodiments, module 504 is a PCIe module. In some embodiments, module 504 may be a Wi-Fi® module, a Bluetooth® module, a satellite navigation module, a near field communication (NFC) module, a digital radio module (e.g., 2G, 3G, LTE), a WiGig® (60 GHz WiFi) module, a WWAN module, a WLAN module, and module circuitry 126 may include circuitry needed to implement functions of the respective module.

Module circuitry 526 comprises hardware, software, firmware, or a combination of hardware, software, and firmware for performing one or more functions of computer system 500. In addition, module circuitry 526 comprises circuitry to participate in a communication with processor 512 via connector 518, socket 520, and bus 506. In some embodiments, module circuitry 526 may be similar to or the same as module circuitry 126. Depending on the type functions module 504 performs, module circuitry 526 may communicate any of a variety of types of signals with processor 512, e.g., a data signal, an address signal, a control signal, or a supply (or other voltage) signal. In embodiments, module circuitry 526 may communicate a sideband signal.

In various embodiments, module circuit board 508 includes second notifier circuitry 536, which may be coupled to module circuit board 508, or included in module 504 as shown in the figure. In various embodiments, second notifier circuitry 536 participates in a communication with second sampler circuitry 517 via connector 518, socket 520, and one or more of bus lines $L_1$-$L_N$ of bus 506. Communication by second notifier circuitry 536 with second sampler circuitry 517 may be distinct from other communications that module circuitry 526 may have with processor 512. In embodiments, second notifier circuitry 536 communicates a signal indicative of a sideband signaling voltage level or a voltage domain.

In various embodiments, SOC 502 includes second sampler circuitry 517, which may be coupled to one of the bus lines $L_1$-$L_N$, e.g., $L_N$. In some embodiments, second sampler circuitry 517 may be a standalone component attached to system circuit board 510. Second sampler circuitry 517 communicates with second notifier circuitry 536 to detect a sideband signaling voltage level used by module 504 or module circuitry 526. The sideband signaling voltage may be the same as a voltage domain of module 504 or module circuitry 526. As used herein, a "voltage domain" is a group of functional circuitry that are operated at a same voltage provided to the group by a supply rail of a voltage regulator. Based on a result of the communication, second sampler circuitry 517 provides the sideband signaling voltage level used by module 504 or module circuitry 526 to level shifting control circuitry 534. In an embodiment, second sampler circuitry 517 provides a voltage domain used by module 504 or module circuitry 526 to level shifting control circuitry 534.

In an embodiment, a ground pin of connector 518 which is not a return for a HSIO (high speed input output) bus line may be used for communications between second notifier circuitry 536 and second sampler circuitry 517. For example, a ground pin of connector 518 may be used to communicate a sideband signaling voltage level or a voltage domain value.

In another embodiment, two or more pins of connector 518 not used for other purposes, e.g., I2C or GPIO lines, may be used for communications between second notifier circuitry 536 and second sampler circuitry 517. For example, I2C or GPIO lines of connector 518 may be used to communicate a sideband signaling voltage level or a voltage domain value. In some embodiments, data or a signal indicative of a sideband signaling voltage level or a voltage domain may be defined as a hardware strap, e.g., as a bus line tied to a particular voltage, or a latch, switch, or jumper. In other embodiments, the signal indicative of data or a signal indicative of a sideband signaling voltage level or a voltage domain may be stored in a memory, e.g., EEPROM 540. I2C or GPIO lines may be used to read a value stored in EEPROM 540.

Second sampler circuitry 517 may sample the particular bus line when it detects the presence of module circuit board 508. In some embodiments, second sampler circuitry 517 may sample the particular bus line during a configuration or start-up stage of module circuitry 526 or module 504. In some embodiments, second sampler circuitry 517 reads data indicative of a sideband signaling voltage level from a hardware strap or a memory, e.g., EEPROM 540 when it detects the presence of module circuit board 508, or at a start-up stage.

Module 504 or module circuitry 526 may use any known sideband signaling voltage level or voltage domain. For example, the signal may indicate that one of 1.2V, 1.6V, 1.8V, or 3.3V correspond with a logic one. The signal may indicate that all or part of module 504 or module circuitry 526 operates in one of 1.2V, 1.6V, 1.8V, or 3.3V voltage domains.

In some embodiments, level shifting control circuitry 534 controls one or more voltage level shifters or translators, e.g., VLT 538, 539. On receipt of the sideband signaling voltage level used by module 504 or module circuitry 526 from second sampler circuitry 517, level shifting control circuitry 534 controls voltage level shifter 538 or 539 so that sideband signals transmitted between SOC 502 and module 504 are compatible with a respective voltage domain of SOC 502, module 504, or module circuitry 526. In embodiments, voltage level shifter 538 may be a bidirectional level shifter. It will be appreciated that a voltage level shifter 539 is an optional alterative to voltage level shifter 538. In various embodiment, one of voltage level shifters 538, 539 may be provided for each line of bus 506 used for sideband signaling. In embodiments, voltage level shifter 538 may be a discrete component attached to system circuit board 510 or integral with SOC 502. Voltage level shifter 538 may be connected to voltage regulator 509, which may be attached to system circuit board 510. In alternative embodiments, voltage level shifter 539 may be a discrete component attached to module circuit board 508 or integral with module 504. Voltage level shifter 539 may be connected to voltage regulator 507, which may be attached to module circuit board 508 or integral with module 504. In addition to controlling the operation of voltage level shifters 538 or 539, in some embodiments, level shifting control circuitry 534 may block module 504 from operating, e.g., when a required voltage level shifter is not present on a bus line in system 500.

FIG. 5 discloses techniques in which second sampler circuitry 517 and level shifting control circuitry 534 of SOC 502 perform certain operations and second notifier circuitry 536 of module 504 performs other operations. It should be appreciated that other arrangements are contemplated. In some embodiments, circuitry of module circuit board 508 may detect a voltage domain of SOC 502 or processor 512, thereby performing a sampling operation similar to that of second sampler circuitry 517. In addition, circuitry (not shown) of module circuit board 508 may control a voltage level shifter 538, 539 so that sideband signaling voltages are compatible with a voltage domain of circuitry external to module circuit board 508, e.g., SOC 502 or processor 512, thereby performing an operation similar to that of level shifting control circuitry 534. Furthermore, circuitry of SOC 502 or processor 512 may communicates a signal indicative of a sideband signaling voltage level or a voltage domain, thereby performing an operation similar to second notifier circuitry 536.

Figure 6:
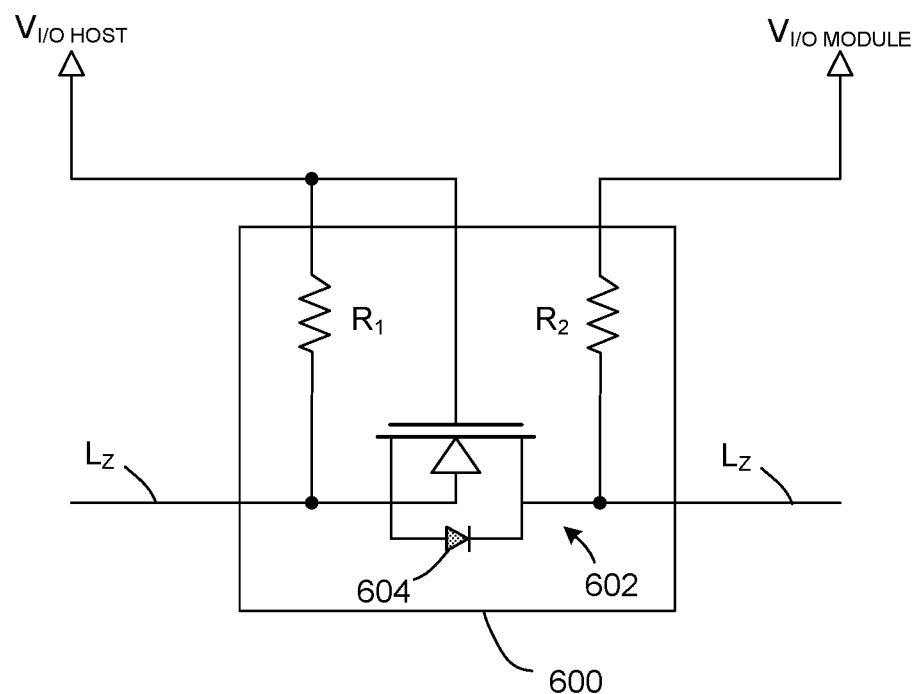
FIG. 6 is a block diagram of voltage level shifter circuitry in accordance with some embodiments.

FIG. 6 is a block diagram of voltage level shifter circuitry 600 in accordance with some embodiments. Voltage level shifter circuitry 600 comprises N-channel enhancement mode MOSFET 602, and resistors R1 and R2. Body diode 604 between drain and substrate may be internal to MOSFET 602 or may be connected externally. Resistor R2 is connected to a supply voltage $V_{I/O\ MODULE}$ of module 504. Resistor R1 is connected to a supply voltage $V_{I/O\ HOST}$ of SOC 502. In various embodiments, level shifting control circuitry 534 sets supply voltage $V_{I/O\ HOST}$ to be substantially equal to supply voltage $V_{I/O\ MODULE}$, thereby assuring that the voltage level used by the module 504 for sideband signaling will be compatible with voltage level used by SOC 502.

Voltage level shifter circuitry 600 may be provided for one or more of bus lines $L_1$-$L_N$ of bus 506 used for sideband signaling, e.g., bus line $L_Z$. Voltage level shifter circuitry 600 has a bi-directional capability, i.e., it is capable of translating a sideband signal received from a module to a voltage that is compatible with a host and a sideband signal transmitted from the host to a voltage that is compatible with the module. In various embodiments, voltage level shifters VLT 538, 539 comprise voltage level shifter circuitry 600. While voltage level shifter circuitry 600 illustrates one technique for translating a signal from one voltage domain to another, other techniques are known in the art. It should be appreciated that embodiments of voltage level shifters VLT 538, 539 are not limited to the method illustrated in FIG. 6. In other embodiments, any suitable technique for translating a signal from one voltage domain to another may be employed.

Figure 7:
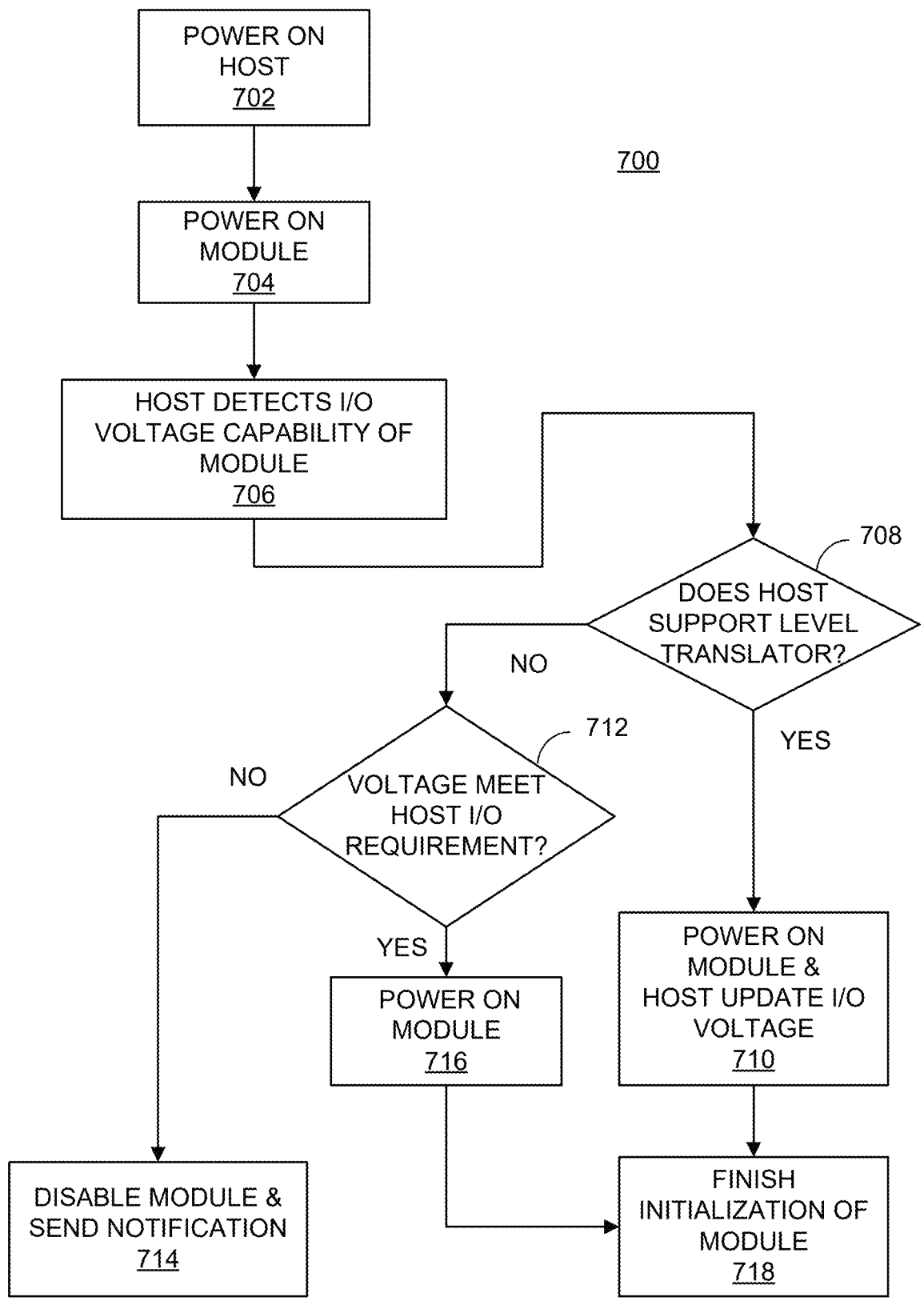
FIG. 7 illustrates a flow diagram of a process for assuring that the voltage level used by a module for sideband signaling will be compatible with voltage level used by a host according to various embodiments.

FIG. 7 illustrates a flow diagram of a process 700 for assuring that the voltage level used by a module for sideband signaling will be compatible with voltage level used by a host according to various embodiments.

At 702, a host, e.g., an SOC or a processor, is powered up. At 704, power on process is started for a module, such as an add-in board or module 108, 208, or 508. At 706, the host detects a sideband signaling voltage level used by the module or a component of the module. The host may detect the sideband signaling voltage level with second sampler circuitry that communicates with second notifier circuitry in the module. The second sampler circuitry may sample a signal on a bus line of a bus, e.g., bus 106, 206, or 506, connecting the host and the module. Alternatively, the second sampler circuitry may read data stored in a memory of the module using bus lines of a bus, e.g., bus 106, 206, or 506, connecting the host and the module.

At 708, it is determined whether the system includes voltage level shifter circuitry for translating a signal from one voltage domain to another. If the system includes voltage level shifter circuitry and the respective voltage domains are not compatible, the voltage level shifter circuitry is controlled at 710 so that sideband signals received from the module are translated to a voltage that is compatible with the host and sideband signals transmitted from the host are translated to a voltage that is compatible with the module. In addition, the module may be fully powered up at 710. If the system does not include voltage level shifter circuitry at 712, it is determined whether the respective voltage domains of the host and module are compatible, e.g., the same. If the respective voltage domains are not compatible, powering up of the module is aborted and is disabled from being powered up at 714. In addition, an error message may be sent to a user interface. If the respective voltage domains are compatible, the powering up process is completed at 716. At 718, an initialization process for the module is completed.

Elements of embodiments (e.g., flowchart with reference to FIGS. 3 and 7) are also provided as a machine-readable medium for storing the computer-executable instructions (e.g., instructions to implement any other processes discussed herein). In some embodiments, a computing platform comprises memory, a processor, machine-readable storage media (also referred to as tangible machine-readable medium), a communication interface (e.g., wireless or wired interface), and a network bus coupled together.

In some embodiments, the various logic blocks are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with the flow diagram of FIGS. 3 and 7 (and/or various embodiments) and executed to implement embodiments of the disclosed subject matter may be implemented as part of an operating system or a specific application, component, program, object, module, routine, or other sequence of instructions or organization of sequences of instructions referred to as Pcode, "program software code/instructions," "operating system program software code/instructions," "application program software code/instructions," or simply "software" or firmware embedded in processor. In some embodiments, the program software code/instructions associated with the sequence flow diagrams of FIGS. 3 and 7 (and/or various embodiments) are executed by the system or one or more components thereof.

In some embodiments, the program software code/instructions associated with reference to FIGS. 3 and 7 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIGS. 3 and 7 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 8:
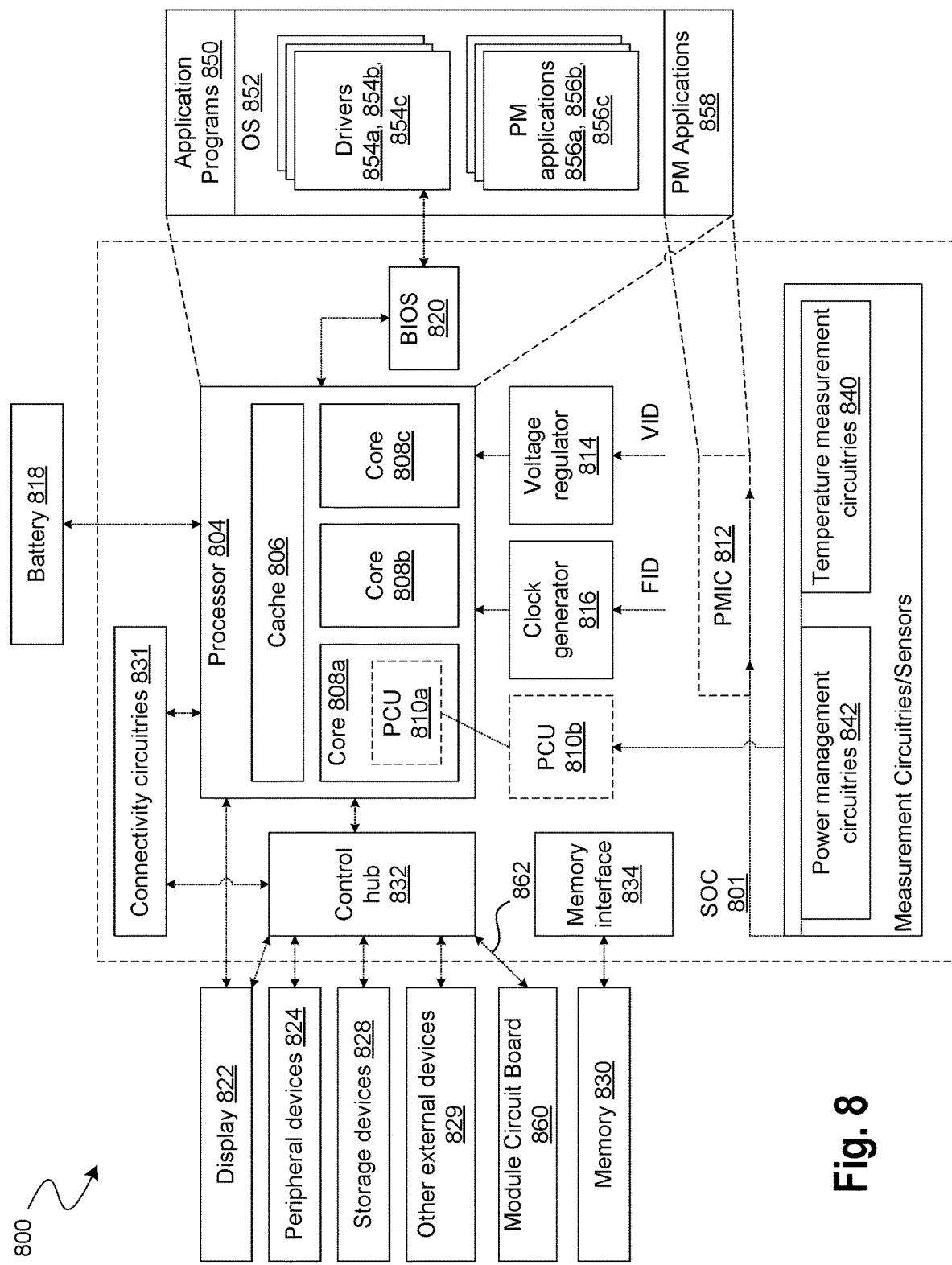
FIG. 8 illustrates a computer system or computing device to limit electric current consumption of a module that receives power from a bus, and to assure that the voltage level used by the module and by a host for sideband signaling match, in accordance with some embodiments.

FIG. 8 illustrates a computer system or computing device 800 (also referred to as device 800) to limit electric current consumption of a module that receives power from a bus, and to assure that the voltage level used by the module and by a host for sideband signaling match, in accordance with some embodiments. It is pointed out that those elements of FIG. 8 having the same reference numbers (or names) as the elements of any other figure can operate or function in any manner similar to that described, but are not limited to such.

In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises a SOC (System-on-Chip) 801. An example boundary of the SOC 801 is illustrated using dotted lines in FIG. 8, with some example components being illustrated to be included within SOC 801—however, SOC 801 may include any appropriate components of device 800.

In some embodiments, device 800 includes processor 804. Processor 804 can include one or more physical devices, such as microprocessors, application processors, microcontrollers, programmable logic devices, processing cores, or other processing means. The processing operations performed by processor 804 include the execution of an operating platform or operating system on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores (also referred to as cores) 808a, 808b, 808c. Although merely three cores 808a, 808b, 808c are illustrated in FIG. 8, the processor 804 may include any other appropriate number of processing cores, e.g., tens, or even hundreds of processing cores. Processor cores 808a, 808b, 808c may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808a, a second section of cache 806 dedicated to core 808b, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, a given processor core (e.g., core 808a) may include a fetch unit to fetch instructions (including instructions with conditional branches) for execution by the core 808a. The instructions may be fetched from any storage devices such as the memory 830. Processor core 808a may also include a decode unit to decode the fetched instruction. For example, the decode unit may decode the fetched instruction into a plurality of micro-operations. Processor core 808a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 808a (for example) may be an out-of-order processor core in one embodiment. Processor core 808*a* may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 808*a* may also include a bus unit to enable communication between components of the processor core 808*a* and other components via one or more buses. Processor core 808*a* may also include one or more registers to store data accessed by various components of the core 808*a* (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory device 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808*a*, 808*b*, 808*c*, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810*a/b* and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810*a*. In an example, some other sections of PCU 810 may be implemented outside the processing cores 808, and these sections of PCU 810 are symbolically illustrated using a dotted box and labelled as PCU 810*b*. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. PMIC 812 may implement various power management operations for device 800.

PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., C0 state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation.

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at a higher performance level. As such, voltage and/or frequency can be increased temporarily for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, Operating System 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856a, 856b, 856c. The OS 852 may also include various drivers 854a, 854b, 854c, etc., some of which may be specific for power management purposes. In some embodiments, device 800 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In some embodiments, device 800 comprises module circuit board 860 and bus 862. Module circuit board 860 may be an add-in card or an expansion card comprising a connector 118. Module circuit board 860 may comprise a module and module circuitry (not shown). In various embodiments, module circuit board 860 may be similar to or the same as module circuit board 108, 208, or 508. In various embodiments, the module may be similar to or the same as module 104, 204, or 504, respectively. In embodiments, bus 862 may be a PCIe bus, and may be the same as or similar to bus 106, 206, or 506. Bus 862 may conform to an industry specification, e.g. PCIe. In embodiments, bus 862 comprises a socket to receive a connector of module circuit board 860.

In some embodiments, module circuit board 860 and control hub 832 communicate to limit electric current consumption that module circuit board 860 receives power from bus 862. In these embodiments, module circuit board 860 comprises instances of first sampler circuitry 128, utilization monitoring and power estimating circuitry 130, and capability setting circuitry 132 (not shown). In addition, control hub 832 comprises an instance of first sampler circuitry 128 (not shown).

In some embodiments, module circuit board 860 and control hub 832 communicate to assure that the voltage level used by module circuit board 860 and by control hub 832 for sideband signaling are compatible, e.g., match. In these embodiments, module circuit board 860 comprises an instance of second notifier 536, control hub 832 comprises an instance of second sampler circuitry 517, and device 800 comprises one or more instances of voltage level translator 538,539.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a circuit board comprising a connector in or on the circuit board, wherein the apparatus is to be coupled to a bus via the connector; first circuitry coupled to the circuit board, the first circuitry to participate in a communication with a processor via the connector and the bus; second circuitry coupled to the first circuitry, the second circuitry to: detect a utilization state of the first circuitry; determine, based on the detected utilization state of the first circuitry, a level of current to be conducted with the connector; and generate a signal which comprises an indication of whether the level of current exceeds a threshold current capacity of the connector; and third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

Example 2: The apparatus of example 1, further comprising: fourth circuitry coupled to the circuit board, the fourth circuitry to participate in another communication via the connector and the bus, the other communication to identify a capability of the apparatus to accommodate a voltage level at the connector.

Example 3: The apparatus of example 2, further comprising: fifth circuitry coupled to the fourth circuitry to determine whether the capability of the apparatus to accommodate a voltage level at the connector is compatible with capability of the processor to accommodate a voltage level at the connector; and sixth circuitry, in response to determining that the capability of the apparatus to accommodate a voltage level at the connector is not compatible with capability of the processor to accommodate a voltage level at the connector, to configure voltage level shifting circuitry connected to the bus.

Example 4: The apparatus of example 2, wherein the connector comprises a plurality of interconnect structures, each interconnect structure corresponding with a bus line of the bus, and the other communication is to identify a capability of the apparatus to accommodate a voltage level at one or more of the interconnect structures of the connector, and wherein the one or more of the interconnect structures of the connector are to be used for a sideband signal comprising a full card power off signal, a module reset signal, a wireless disable signal, a co-existence signal, or a configuration signal.

Example 5: The apparatus of example 1, further comprising: fourth circuitry coupled to the circuit board, the fourth circuitry to participate in another communication via the connector and the bus, the other communication to identify the threshold current capacity of the connector.

Example 6: The apparatus of example 1, wherein operation of the first circuitry in the first operational mode is associated with a level of current in the conductor that is less than or equal to the threshold current capacity of the connector.

Example 7: The apparatus of example 6, wherein the first circuitry is a wireless wide area network (WWAN) module and the first operational mode uses a particular number of component carrier connections or a particular transmit power value.

Example 8: The apparatus of example 6, wherein the first circuitry is a solid state drive (SSD) memory module and the first operational mode uses a particular dynamic power allocation (DPA) sub-state.

Example 9: The apparatus of example 6, wherein the first circuitry is a graphics processing module, and the first operational mode uses a particular clock value.

Example 10: The apparatus of example 1, wherein the connector is a peripheral component interconnect express (PCIe) M.2 form factor connector.

Example 11. The apparatus of example 1, wherein the bus is a peripheral component interconnect express (PCIe) bus.

Example 12: A system comprising: a processor; a module coupled to the processor via a bus, the module comprising: a circuit board, wherein the module is coupled to the bus via a connector in or on a circuit board; first circuitry coupled to the circuit board, the first circuitry to participate in a communication with the processor via the connector and the bus; second circuitry coupled to the first circuitry, the second circuitry to: determine, based on a utilization state of the first circuitry, a level of current to be conducted with the connector, and generate a signal which comprises an indication of whether the level of current exceeds a threshold current capacity of the connector; and third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

Example 13: The system of example 12, further comprising: fourth circuitry coupled to the circuit board, the fourth circuitry to participate in another communication via the connector and the bus, the other communication to identify a capability of the module to accommodate a voltage level at the connector; fifth circuitry coupled to the fourth circuitry to determine whether the capability of the module to accommodate a voltage level at the connector is compatible with capability of the processor to accommodate a voltage level at the connector; and sixth circuitry, in response to determining that the capability of the module to accommodate a voltage level at the connector is not compatible with capability of the processor to accommodate a voltage level at the connector, to configure voltage level shifting circuitry connected to the bus.

Example 14: The system of example 12, further comprising: fourth circuitry coupled to the circuit board, the fourth circuitry to participate in another communication via the connector and the bus, the other communication to identify the threshold current capacity of the connector.

Example 15: The system of example 12, wherein operation of the first circuitry in the first operational mode is associated with a level of current in the conductor that is less than or equal to the threshold current capacity of the connector.

Example 16: The system of example 12, wherein the module comprises a wide-area network (WWAN) module, a graphics module, or a solid-state memory device (SSD).

Example 17: A packaged device comprising: a hardware interface to couple the packaged device to a circuit board; first circuitry coupled to the hardware interface, the first circuitry to participate in a communication with a processor while the circuit board is coupled to the processor via a bus and a connector in or on the circuit board; second circuitry coupled to the first circuitry, the second circuitry to: determine a threshold current capacity of the connector; detect a utilization state of the first circuitry; determine, based on the detected utilization state of the first circuitry, a level of current to be conducted with the connector; and generate a signal which comprises an indication of whether the level of current exceeds the threshold current capacity of the connector; and third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

Example 18: The packaged device of example 17, further comprising: fourth circuitry coupled to the circuit board, the fourth circuitry to participate in another communication via the connector and the bus, the other communication to identify a capability of the packaged device to accommodate a voltage level at the connector.

Example 19: The packaged device of example 17, further comprising: fifth circuitry coupled to the fourth circuitry to determine whether the capability of the packaged device to accommodate a voltage level at the connector is compatible with capability of the processor to accommodate a voltage level at the connector; and sixth circuitry, in response to determining that the capability of the packaged device to accommodate a voltage level at the connector is not compatible with capability of the processor to accommodate a voltage level at the connector, to configure voltage level shifting circuitry connected to the bus.

Example 20: The packaged device of example 17, further comprising: fourth circuitry coupled to the circuit board, the fourth circuitry to participate in another communication via the connector and the bus, the other communication to identify the threshold current capacity of the connector, wherein operation of the first circuitry in the first operational mode is associated with a level of current in the conductor that is less than or equal to the threshold current capacity of the connector.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a circuit board comprising a connector in or on the circuit board, wherein the apparatus is to be coupled to a bus via the connector;
   first circuitry coupled to the circuit board, the first circuitry to participate in a communication with a processor via the connector and the bus;
   second circuitry coupled to the first circuitry, the second circuitry to:
   detect a utilization state of the first circuitry;
   determine, based on the detected utilization state of the first circuitry, a level of current to be conducted with the connector; and
   generate a signal which comprises an indication of whether the level of current exceeds a threshold current capacity of the connector; and
   third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

2. The apparatus of claim 1, further comprising:
   fourth circuitry coupled to the circuit board, the fourth circuitry to participate in another communication via the connector and the bus, the other communication to identify a capability of the apparatus to accommodate a voltage level at the connector.

3. The apparatus of claim 2, further comprising:
   fifth circuitry coupled to the fourth circuitry to determine whether the capability of the apparatus to accommodate a voltage level at the connector is compatible with a capability of the processor to accommodate a voltage level at the connector; and
   sixth circuitry, in response to determining that the capability of the apparatus to accommodate a voltage level at the connector is not compatible with the capability of the processor to accommodate a voltage level at the connector, to configure voltage level shifting circuitry connected to the bus.

4. The apparatus of claim 2, wherein the connector comprises a plurality of interconnect structures, each interconnect structure corresponding with a bus line of the bus, and the other communication is to identify a capability of the apparatus to accommodate a voltage level at one or more of the interconnect structures of the connector, and
   wherein the one or more of the interconnect structures of the connector are to be used for a sideband signal comprising a full card power off signal, a module reset signal, a wireless disable signal, a co-existence signal, or a configuration signal.

5. The apparatus of claim 1, further comprising:
   fourth circuitry coupled to the circuit board, the fourth circuitry to participate in another communication via the connector and the bus, the other communication to identify the threshold current capacity of the connector.

6. The apparatus of claim 1, wherein operation of the first circuitry in the first operational mode is associated with a level of current in the connector that is less than or equal to the threshold current capacity of the connector.

7. The apparatus of claim 6, wherein the first circuitry is a wireless wide area network (WWAN) module and the first operational mode uses a particular number of component carrier connections or a particular transmit power value.

8. The apparatus of claim 6, wherein the first circuitry is a solid state drive (SSD) memory module and the first operational mode uses a particular dynamic power allocation (DPA) sub-state.

9. The apparatus of claim 6, wherein the first circuitry is a graphics processing module, and the first operational mode uses a particular clock value.

10. The apparatus of claim 1, wherein the connector is a peripheral component interconnect express (PCIe) M.2 form factor connector.

11. The apparatus of claim 1, wherein the bus is a peripheral component interconnect express (PCIe) bus.

12. A system comprising:
a processor;
a module coupled to the processor via a bus, the module comprising:
a circuit board, wherein the module is coupled to the bus via a connector in or on a circuit board;
first circuitry coupled to the circuit board, the first circuitry to participate in a communication with the processor via the connector and the bus;
second circuitry coupled to the first circuitry, the second circuitry to: determine, based on a utilization state of the first circuitry, a level of current to be conducted with the connector, and generate a signal which comprises an indication of whether the level of current exceeds a threshold current capacity of the connector; and
third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

13. The system of claim 12, further comprising:
fourth circuitry coupled to the circuit board, the fourth circuitry to participate in another communication via the connector and the bus, the other communication to identify a capability of the module to accommodate a voltage level at the connector;
fifth circuitry coupled to the fourth circuitry to determine whether the capability of the module to accommodate a voltage level at the connector is compatible with a capability of the processor to accommodate a voltage level at the connector; and
sixth circuitry, in response to determining that the capability of the module to accommodate a voltage level at the connector is not compatible with the capability of the processor to accommodate a voltage level at the connector, to configure voltage level shifting circuitry connected to the bus.

14. The system of claim 12, further comprising:
fourth circuitry coupled to the circuit board, the fourth circuitry to participate in another communication via the connector and the bus, the other communication to identify the threshold current capacity of the connector.

15. The system of claim 12, wherein operation of the first circuitry in the first operational mode is associated with a level of current in the conductor that is less than or equal to the threshold current capacity of the connector.

16. The system of claim 12, wherein the module comprises a wide-area network (WWAN) module, a graphics module, or a solid-state memory device (SSD).

17. A packaged device comprising:
first circuitry coupled to a hardware interface, the hardware interface to couple the packaged device to a circuit board, the first circuitry to participate in a communication with a processor while the circuit board is coupled to the processor via a bus and a connector;
second circuitry coupled to the first circuitry, the second circuitry to:
determine a threshold current capacity of the connector;
detect a utilization state of the first circuitry;
determine, based on the detected utilization state of the first circuitry, a level of current to be conducted with the connector; and
generate a signal which comprises an indication of whether the level of current to be conducted exceeds the threshold current capacity of the connector; and
third circuitry coupled to the first circuitry and the second circuitry, wherein, based on the signal, the third circuitry is to select a first operational mode from among multiple operational modes, wherein the first circuitry is to operate in any of the multiple operational modes responsive to the third circuitry.

18. The packaged device of claim 17, further comprising:
fourth circuitry coupled to the circuit board, the fourth circuitry to participate in another communication via the connector and the bus, the other communication to identify a capability of the packaged device to accommodate a voltage level at the connector.

19. The packaged device of claim 18, further comprising:
fifth circuitry coupled to the fourth circuitry to determine whether the capability of the packaged device to accommodate a voltage level at the connector is compatible with capability of the processor to accommodate a voltage level at the connector; and
sixth circuitry, in response to determining that the capability of the packaged device to accommodate a voltage level at the connector is not compatible with a capability of the processor to accommodate a voltage level at the connector, to configure voltage level shifting circuitry connected to the bus.

20. The packaged device of claim 17, further comprising:
fourth circuitry coupled to the circuit board, the fourth circuitry to participate in another communication via the connector and the bus, the other communication to identify the threshold current capacity of the connector, wherein operation of the first circuitry in the first operational mode is associated with a level of current in the conductor that is less than or equal to the threshold current capacity of the connector.

* * * * *